(12) United States Patent
Abe et al.

(10) Patent No.: US 7,558,764 B2
(45) Date of Patent: Jul. 7, 2009

(54) METHODS FOR MULTI-CLASS COST-SENSITIVE LEARNING

(75) Inventors: Naoki Abe, Rye, NY (US); Bianca Zadrozny, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/937,629

(22) Filed: Nov. 9, 2007

(65) Prior Publication Data

US 2008/0065572 A1 Mar. 13, 2008

Related U.S. Application Data

(62) Division of application No. 10/876,533, filed on Jun. 28, 2004, now abandoned.

(51) Int. Cl.
G06F 15/18 (2006.01)
G06E 1/00 (2006.01)
G06E 3/00 (2006.01)
G06G 7/00 (2006.01)

(52) U.S. Cl. .............................. 706/14; 706/12; 706/20; 706/932

(58) Field of Classification Search .................. 706/12, 706/14, 20, 25, 932, 934
See application file for complete search history.

(56) References Cited

U.S. PATENT DOCUMENTS 3,483,512 A 12/1969 Atkins 6,678,548 B1 1/2004 Echauz et al.

OTHER PUBLICATIONS

Langford,J. et. al. "Cost-Sensitive Learning by Cost-Proportionate Example Weighting" IEEE. 2003.
Valentini,G. et. al. "Ensembles of Learning Machines" Springer-Verlag. 2002.
Shiffman,S. "Segmentation of Medical Image Volumes Using Intrinsic Shape Information" Dissertation. Stanford University. 1999.

(Continued)

*Primary Examiner*—David R Vincent
*Assistant Examiner*—Benjamin Buss
(74) *Attorney, Agent, or Firm*—Whitham, Curtis, Christofferson & Cook, PC; Stephen C. Kaufman

(57) ABSTRACT

Methods for multi-class cost-sensitive learning are based on iterative example weighting schemes and solve multi-class cost-sensitive learning problems using a binary classification algorithm. One of the methods works by iteratively applying weighted sampling from an expanded data set, which is obtained by enhancing each example in the original data set with as many data points as there are possible labels for any single instance, using a weighting scheme which gives each labeled example the weight specified as the difference between the average cost on that instance by the averaged hypotheses from the iterations so far and the misclassification cost associated with the label in the labeled example in question. It then calls the component classification algorithm on a modified binary classification problem in which each example is itself already a labeled pair, and its (meta) label is 1 or 0 depending on whether the example weight in the above weighting scheme is positive or negative, respectively. It then finally outputs a classifier hypothesis which is the average of all the hypotheses output in the respective iterations.

10 Claims, 5 Drawing Sheets

OTHER PUBLICATIONS

J. Bradford, C. Kunz, R. Kohavi, C. Brunk, and C. Brodley, "Pruning decision trees with misclassification costs", *Proceedings of the European Conference on Machine Learning*, pp. 131-136, 1998.

P. Geibel and F. Wysotzki, "Perceptron based learning with example dependent and noisy costs", *Proceedings of the Twentieth International Conference on Machine Learning*, 2003.

G. Fumera and F. Roli, "Cost-sensitive learning in support vector machines", *VIII Convegno Associazione Italiana per L'Intelligenza Artificiale*, 2002.

P. Domingos, "MetaCost: A general method for making classifiers cost sensitive", *Proceedings of the Fifth International Conference on Knowledge Discovery and Data Mining*, pp. 144-164, ACM Press, 1999.

D. Margineantu, *Methods for Cost-Sensitive Learning*, PhD thesis, Department of Computer Science, Oregon State University, Corvallis, 2001.

B. Zadrozny and C. Elkan, "Learning and making decisions when costs and probabilities are both unknown", *Proceedings of the Seventh International Confernece on Knowledge Discovery and Data Mining*, pp. 204-213, ACM Press, 2001.

P. Chan and S. Stolfo, "Toward scalable learning with non-uniform class and cost distributions", *Proceedings of the Fourth International Conference on Knowledge Discovery and Data Mining*, pp. 164-168, 1998.

B. Zadrozny, J. Langford, and N. Abe, "Cost-sensitive learning by cost-proportionate example weighting", *Proceedings of the Third IEEE International Conference on Data Mining*, pp. 435-442, 2003.

L. Breiman, "Bagging predictors", *Machine Learning*, 24(2):123-140, 1996.

C. Elkan, "Magical thinking in data mining: Lessons from coil challenge 2000", *Proceedings of the Seventh International Conference on Knowledge Discovery and Data Mining*, pp. 426-431, ACM Press, 1999.

W. Fan, S. J. Stolfo, J. Zhang, and P. K. Chan, "AdaCost: Misclassification cost-sensitive boosting", *Proceedings of the Sixteenth International Conference on Machine Learning*, pp. 97-105, 1999.

Naoki Abe, Bianca Zadrozny and John Langford entitled "An Iterative Method for Multi-class Cost-sensitive Learning", hereinafter the Abe et al. paper, which was presented and published at the Tenth ACM SGKDD Conference on Knowledge Discovery and Data Mining, Aug. 22-25, 2004.

```
Count > 40 : 0 (2284.0/13.0)
Count <= 40 :
|   count <= 0 : 0 (1375.0/1.4)
|   count > 0 :
|   |   srv_count > 53 : 0 (207.0/7.3)
|   |   srv_count <= 53 :
|   |   |   srv_count <= 0 : 0 (123.0/1.4)
|   |   |   srv_count > 0 :
|   |   |   |   serror_rate <= 0.000502569 :
|   |   |   |   |   dst_host_serror_rate <= 0.0101501 :
|   |   |   |   |   — etc.
|   |   |   |   |   dst_host_serror_rate > 0.0101501 :
|   |   |   |   |   — etc.
|   |   |   |   serror_rate > 0.000502569 : etc.
```

*Figure 5*

METHODS FOR MULTI-CLASS COST-SENSITIVE LEARNING

CROSS REFERENCE TO RELATED APPLICATION

This application is a division of application Ser. No. 10/876,533 filed Jun. 28, 2004, now abandoned, by Naoki Abe et al. and assigned to a common assignee herewith.

BACKGROUND OF THE INVENTION

1. Field of the Invention

The present invention generally relates to the field of cost-sensitive learning in the areas of machine learning and data mining and, more particularly, to methods for solving multi-class cost-sensitive learning problems using a binary classification algorithm. This algorithm is based on techniques of data space expansion and gradient boosting with stochastic ensembles.

2. Background Description

Classification in the presence of varying costs associated with different types of misclassification is important for practical applications, including many data mining applications, such as targeted marketing, fraud and intrusion detection, among others. Classification is often idealized as a problem where every example is equally important, and the cost of misclassification is always the same. The real world is messier. Typically, some examples are much more important than others, and the cost of misclassifying in one way differs from the cost of misclassifying in another way. A body of work on this subject has become known as cost-sensitive learning, in the areas of machine learning and data mining.

Research in cost-sensitive learning falls into three main categories. The first category is concerned with making particular classifier learners cost-sensitive, including methods specific for decision trees (see, for example, U. Knoll, G. Nakhaeizadeh, and B. Tausend, "Cost-sensitive pruning of decision trees", *Proceedings of the Eight European Conference on Machine Learning*, pp. 383-386, 1994, and J. Bradford, C. Kunz, R. Kohavi, C. Brunk, and C. Brodley, "Pruning decision trees with misclassification costs", *Proceedings of the European Conference on Machine Learning*, pp. 131-136, 1998), neural networks (see, for example, P. Geibel and F. Wysotzki, "Perceptron based learning with example dependent and noisy costs", *Proceedings of the Twentieth International Conference on Machine Learning*, 2003), and support vector machines (see, for example, G. Fumera and F. Roli, "Cost-sensitive learning in support vector machines", *VIII Convegno Associazione Italiana per L'Intelligenza Artificiale*, 2002). The second category uses Bayes risk theory to assign each example to its lowest expected cost class (see, for example, P. Domingos, "MetaCost: A general method for making classifiers cost sensitive", *Proceedings of the Fifth International Conference on Knowledge Discovery and Data Mining*, pp. 144-164, ACM Press, 1999, and D. Margineantu, *Methods for Cost-Sensitive Learning*, PhD thesis, Department of Computer Science, Oregon State University, Corvallis, 2001). This requires classifiers to output class membership probabilities and sometimes requires estimating costs (see, B. Zadrozny and C. Elkan, "Learning and making decisions when costs and probabilities are both unknown", *Proceedings of the Seventh International Conference on Knowledge Discovery and Data Mining*, pp. 204-213, ACM Press, 2001) (when the costs are unknown at classification time). The third category concerns methods that modify the distribution of training examples before applying the classifier learning method, so that the classifier learned from the modified distribution is cost-sensitive. We call this approach cost-sensitive learning by example weighting. Work in this area includes stratification methods (see, for example, P. Chan and S. Stolfo, "Toward scalable learning with non-uniform class and cost distributions", *Proceedings of the Fourth International Conference on Knowledge Discovery and Data Mining*, pp. 164-168, 1998, and L. Breiman, J. H. Friedman, R. A. Olsen, and C. J. Stone, *Classification and Regression Trees*, Wadsworth International Group, 1984) and the costing algorithm (see, for example, B. Zadrozny, J. Langford, and N. Abe, "Cost-sensitive learning by cost-proportionate example weighting", *Proceedings of the Third IEEE International Conference on Data Mining*, pp. 435-442, 2003). This approach is very general since it reuses arbitrary classifier learners and does not require accurate class probability estimates from the classifier. Empirically this approach attains similar or better cost-minimization performance.

Unfortunately, current methods in this category suffer from a major limitation: they are well-understood only for two-class problems. In the two-class case, it is easy to show that each example should be weighted proportionally to the difference in cost between predicting correctly or incorrectly (see, again, Zadrozny et al., ibid.). However, in the multi-class case there is more than one way in which a classifier can make a mistake, breaking the application of this simple formula. Heuristics, such as weighting examples by the average misclassification cost, have been proposed (see, again, Breiman et al., ibid., and the Margineantu thesis, ibid.), but they are not well-motivated theoretically and do not seem to work very well in practice when compared to methods that use Bayes risk minimization (see, again, Domingos, ibid.).

SUMMARY OF THE INVENTION

It is therefore an object of the present invention to provide a method for multi-class cost-sensitive learning based on an example weighting scheme.

According to the invention, the methods are based on example weighting schemes that are derived using two key ideas: 1) data space expansion and 2) gradient boosting with stochastic ensembles. The latter is a formal framework that give rise to a coherent body of methods.

One of the methods of invention, which is based on the idea 1) above, works by repeatedly sampling from the expanded data set, which is obtained by enhancing each example in the original data set with as many data points as there are possible labels for any single instance. It then repeatedly draws subsample from this expanded data set using weighted sampling according to a certain example weighting scheme, in which each labeled example is given the weight specified as the difference between the maximum possible misclassification cost for the instance in question and the misclassification associated with the label in the particular labeled example. The example weighting remains constant throughout the iterative sampling procedure. It then finally outputs a classifier hypothesis which is the average of all the hypotheses output in the respective iterations.

Another one of the methods of invention, which is based on the idea 2) above, works by iteratively applying weighted sampling from the same expanded data set, using a different weighting scheme. The weighting scheme of this method gives each labeled example the weight specified as the difference between the average cost on that instance by the averaged hypotheses from the iterations so far and the misclassification cost associated with the label in the labeled example in question. Emphatically, the weighting changes in every iteration, since it depends on the performance of the averaged hypothesis obtained up to the current iteration. Additionally, the example weights used in this method can be both positive and negative, since the label given in any labeled example does not necessarily correspond to the best label for the given instance, i.e. the label with the minimum cost, due to the use of data space expansion. Negative weights do not admit the use of weighted sampling. The method deals with this problem by calling the component classification algorithm on a modified binary classification problem in which each example is itself already a labeled pair, and its (meta) label is 1 or 0 depending on whether the example weight in the above weighting scheme is positive or negative, respectively.

The results of the methods of invention are obtained by outputting all of the classifier representations obtained through the iterations, and represent the average over them. These representations can be arbitrary representations of classifiers, such as decision trees, neural networks and support vector machines, for the problem at hand, such as network intrusion detection, fraud detection, targeted marketing, credit risk rating, among other things. For example, in the application to network intrusion detection, each one of these representations could be a decision tree that specifies a set of conditions on various attributes of a network connection event, which together signal certain types of network intrusion. Such representations can be further applied on a new network connection to output judgment whether or not the connection is to be suspected to be some type of an intrusion attempt with reasonable likelihood, and decisions can be based on this judgment to determine the appropriate course of action, such as denial of service or probing.

BRIEF DESCRIPTION OF THE DRAWINGS

The foregoing and other objects, aspects and advantages will be better understood from the following detailed description of a preferred embodiment of the invention with reference to the drawings, in which:

FIG. 5 is an example of a decision tree to illustrate the process implemented by the invention.

DETAILED DESCRIPTION OF A PREFERRED EMBODIMENT OF THE INVENTION

Figure 1:
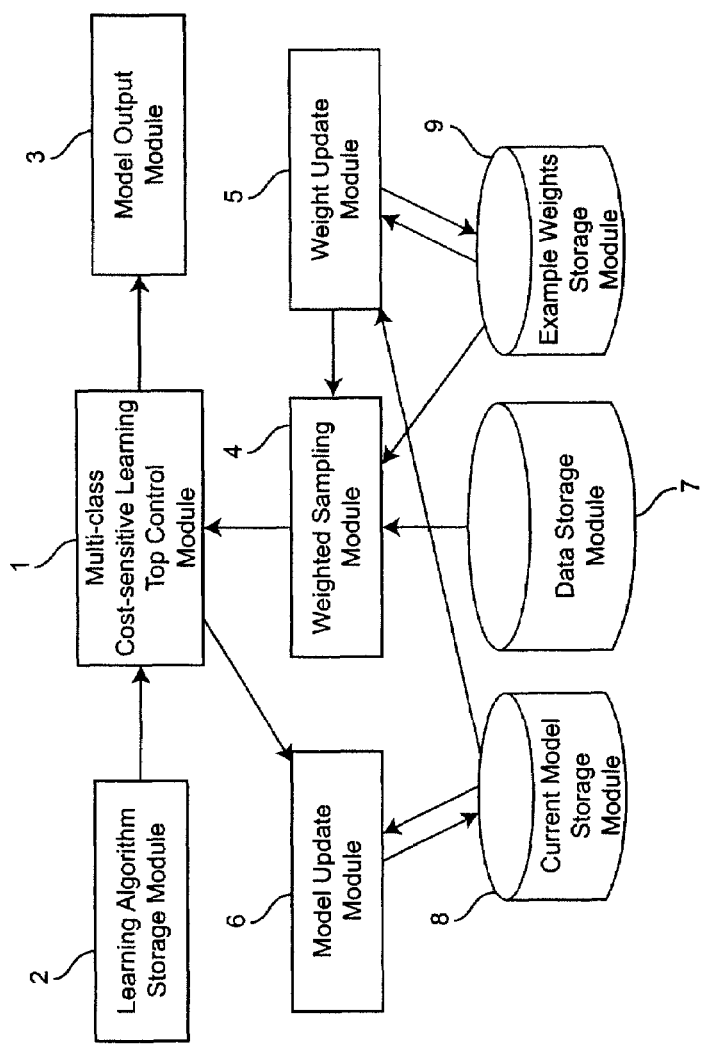
FIG. 1 is a block diagram showing the architecture of the system implementing one of the methods according to the invention.

We begin by introducing some general concepts and notation we use in the rest of the description.

Cost-Sensitive Learning and Related Problems

A popular formulation of the cost-sensitive learning problem is via the use of a cost matrix. A cost matrix, $C(y_1, y_2)$, specifies how much cost is incurred when misclassifying an example labeled $y_2$ as $y_1$, and the goal of a cost-sensitive learning method is to minimize the expected cost. Zadrozny and Elkan (B. Zadrozny and C. Elkan, "Learning and making decisions when costs and probabilities are both unknown", *Proceedings of the seventh International Conference on Knowledge Discovery and Data Mining*, pp. 204-213, ACM Press, 2001) noted that this formulation is not applicable in situations in which misclassification costs depend on particular instances, and proposed a more general form of cost function, $C(x, y_1, y_2)$, that allows dependence on the instance x. Here we adopt this general formulation, but note that in the reasonable case in which the cost is minimized by the true label, we can drop the redundant information $y_2$ and write $C(x, y_1)$ for $C(x, y_1, y_2)$.

Once we allow the costs to depend on each example, it is natural to assume that the costs are generated according to some distribution, along with the examples, which leads to the following formulation. In (multi-class) cost sensitive classification, examples of the form $(x, <C(x, y_1), \ldots, C(x, y_k)>$ are drawn from a distribution D over a domain $X \times R^+_k$. (Throughout, we will let k denote |Y|.) Given a set of examples, $S=(x_i, <C(x_i, y)>_{y \in Y})^m$, the goal is to find a classifier h: $X \to \{1, \ldots, k\}$ which minimizes the expected cost of the classifier:

$$\arg\min_h E_D[C(x, h(x))] \quad (1)$$

We can assume without loss of generality that the costs are normalized so that $$\forall x \in X \min_{y \in Y} C(x, y) = 0.$$

Note that with this normalization, the above formulation of cost is equivalent to the common formulation in terms of misclassification cost, i.e., $$\min_h E_D[C(x, h(x))I(h(x) \neq \arg\min_y C(x, y))]$$

Normally a learning method attempts to do this by minimizing the empirical cost in the given training data, given some hypothesis class $\mathcal{H}$:

$$\arg\min_{h \in \mathcal{H}} \sum_{(x, \langle C(x,y) \rangle_{y \in Y}) \in S} C(x, h(x)) \quad (2)$$

We note that we sometimes use the empirical expectation notation, $\hat{E}$, to refer to the averaged empirical cost, namely $$\hat{E}_{(x, \langle C(x,y) \rangle_{y \in Y}) \sim S} C(x, h(x)) = \frac{1}{|S|} \sum_{(x, \langle C(x,y) \rangle_{y \in Y}) \in S} C(x, h(x))$$

As a building block of our method, we make use of methods for solving importance weighted classification problems, which we define below. In importance weighted classification, examples of the form (x, y, c) are drawn from a distribution D over a domain $X \times Y \times R^+$. Given a set of examples $S=(x, y, c)^m$, the goal is to find a classifier h: $X \to Y$ having minimum importance-weighted misclassification error:

$$\arg\min_h E_{(x,y,c) \sim D} c \cdot I(h(x) \neq y)$$

Again, usually, a learning method attempts to meet this goal by minimizing the empirical weighted error in some hypothesis class $\mathcal{H}$:

$$\arg\min_{h \in \mathcal{H}} \sum_{(x,y,c) \in S} c \cdot I(h(x) \neq y) \quad (3)$$

We note that importance weighted classification can be solved very well with a classification method, by use of weighted rejection sampling techniques (see, again, Zadrozny, Langford, and Abe, ibid.).

Hypothesis Representations and Other Notation

In the above, we assumed that the hypotheses output by a cost-sensitive learner is a functional hypothesis h, i.e., h: $X \to Y$. It is also possible to allow hypotheses that are stochastic, namely $$h: X \times Y \to [0, 1]$$

subject to the stochastic condition:

$$\forall x \in X \sum_{y \in Y} h(x, y) = 1.$$

With stochastic hypotheses, stochastic cost-sensitive learning is defined as that of minimizing the following expected cost:

$$\arg\min_h E_D \sum_{y \in Y} C(x, y) h(x, y)$$

Note that in the special case that h is deterministic, this formulation is equivalent to the definition given in Equation (1). Also, this is a convexification of the standard objective function that we usually expect a stochastic cost-sensitive learner to minimize, i.e., $$E_D \left[ C\left(x, \arg\max_{y \in Y} h(x, y)\right) \right]$$

We also consider a variant of cost-sensitive learning in which relational hypotheses are allowed. Here relational hypotheses h are relations over $X \times Y$, i.e., h: $X \times Y \to \{0, 1\}$. In general h is neither functional nor stochastic, and in particular it may violate the stochastic condition, $$\sum_{y \in Y} h(x, y) = 1.$$

We often use the more general notation of h(x, y), meant for stochastic and relational hypotheses, even when h is a deterministic function from X to Y. As notational shorthand, for a stochastic hypothesis h, we write h(x) to denote h(x, ·): $Y \to [0, 1]$, and C(x, h(x)) to denote the expected cost of its predictions, i.e., $$C(x, h(x)) = \sum_{y \in Y} h(x, y) C(x, y).$$

Finally, we note that we often write "$x \in S$" as a shorthand for "$\exists y \in Y\, (x,y) \in S$".

The Methodology

Our methodology can be interpreted as a reduction, which translates a multi-class cost-sensitive learning problem to a classifier learning problem. That is, it allows us to solve the cost-sensitive learning problem using an arbitrary classifier learning method as a component algorithm. This methodology is derived using two key ideas: 1) expanding data space and 2) gradient boosting with stochastic ensembles. Theoretical performance guarantee on a particular variant of the invented methodology is derived using a convexification of the objective function by the expected cost function. Below we will explain these two key ideas by exhibiting a prototypical method based on each.

A representative method in the prior art of iterative methods for cost-sensitive learning is the method proposed in Zadrozny, Langford and Abe, ibid., called costing. The weighting scheme of this method exploits the following observation: For the binary class case, the above formulation in terms of cost per example, $C(x, y_2)$, can be further reduced to a formulation in terms of a single importance number per example. This is possible by associating a number indicating the importance of an example $(x, y_2)$, given by $|C(x, 0) - C(x, 1)|$. This conversion allows us to reduce the cost-sensitive learning problem to a weighted classifier learning problem, but it has not been known how that would be done for the multi-class scenario. It is therefore natural to consider iterative weighting schemes, in which example weights are iteratively modified in search for the optimal weighting.

A straightforward application of iterative weighting suffers from an inability to directly take into account the different costs associated with multiple ways of misclassifying examples. This translates to non-convergence of the method in practice. We address this issue by the technique of expanding data space, the first of the two key ideas.

Data Space Expansion

The objective of minimizing the empirical cost on the original training sample is equivalent to minimization on the following expanded sample. Given a labeled sample S consisting of $(x, <C(x, y)>_{y \in Y})$ of size m, we define a sample S' of size mk for classification, where k is the size of the label set, i.e., k=|Y|, as follows.

$$S' = \left\{ \left(x, y, \max_{x,y} C(x, y) - C(x, y)\right) \mid (x, \langle C(x, y) \rangle_{y \in Y}) \in S, y \in Y \right\}$$

Minimizing the importance weighted loss, $$\sum_{(x,y,c) \in S'} c \cdot I(h(x) \neq y)$$

on this new dataset also minimizes the cost on our original sample. The algorithm DSE (Data Space Expansion) takes advantage of this observation, which is summarized below as a theorem.

THEOREM 1. With the definitions given in FIG. 3, a hypothesis IL minimizing the weighted classification error on the expanded weighted sample S', $$\hat{E}_{(x,y,c) \sim S'} [c \cdot I(h(x) \neq y)]$$

also minimizes the cost on the original sample S, $$\hat{E}_{(x,y,c) \sim S'} [C_{h(x)}].$$

Proof $$\arg\min_h \hat{E}_{(x,y,c) \sim S'} [c \cdot I(h(x) \neq y)] =$$

$$\arg\min_h \hat{E}_{(x,\vec{C}) \sim S} \sum_{y \in Y} \left[ \left( \max_{y' \in Y} C_{y'} - C_y \right) \cdot I(h(x) \neq y) \right] =$$

$$\arg\max_h \hat{E}_{(x,\vec{C}) \sim S} \sum_{y \in Y} [C_y \cdot I(h(x) \neq y)] =$$

$$\arg\max_h \hat{E}_{(x,\vec{C}) \sim S} \left[ \left( \sum_{y \in Y} C_y \right) - C_{h(x)} \right] = \arg\max_h \hat{E}_{(x,\vec{C}) \sim S} [C_{h(x)}]$$

Gradient Boosting with Stochastic Ensembles

Having described the idea of data space expansion, we now combine it with the gradient boosting framework to arrive at our main method. In particular, we cast the stochastic multi-class cost-sensitive learning in the framework of gradient boosting (see L. Mason, J. Baxter, P. Barlett, and M. Frean, "Boosting algorithms as gradient descent", *Advances in Neural Information Processing Systems* 12, pp. 512-518, 2000), with the objective function defined as the expected cost of the stochastic ensemble, obtained as a mixture of individual hypotheses, on the expanded data set. As we stated above, a functional hypothesis of the form h: X→Y can be viewed as a special case of a stochastic hypothesis. We then define a stochastic ensemble hypothesis H, given multiple functional hypotheses, $h_t$, t=1, ..., T, as the conditional distribution defined as the mixture of the component hypotheses, namely, $$\forall x \in X, \forall y \in Y, H(x, y) = \sum_{t=1}^{T} h_t(x, y)$$

Let $H_t$ denote the mixture hypothesis of the learning procedure at round t. The procedure is to update its current combined hypothesis by the mixture of the previous combined hypothesis and a new hypothesis, i.e., by setting $$H_t(x, y) = (1-\beta) H_{t-1}(x, y) + \beta h(x, y)$$

Thus, the expected cost of $H_t$ on x is $$C(x, H_t(x)) = (1-\beta) C(x, H_{t-1}(x)) + \beta C(x, h_t(x))$$

Now, suppose that h predicts a particular label y for x, i.e., h(x, y)=1, then $$C(x, H_t(x)) = (1-\beta) C(x, H_{t-1}(x)) + \beta C(x, y)$$

If we now take a derivative of this function with respect to $\beta$, we get $$\frac{\partial C(x, H_t(x))}{\partial \beta} = C(x, y) - C(x, H_{t-1}(x))$$

Note that this is the difference between the average cost of the current ensemble hypothesis and the new weak hypothesis assigning probability one to the specified label.

We then take this derivative with respect to all data points (x, y) in the expanded data set S', and thus the gradient is mk-dimensional. We then expect the weak learner to find a hypothesis h whose inner-product with the negative gradient is large. That is, the output h of the weak learner seeks to maximize the following sum.

$$-\langle h, \nabla C \rangle = \frac{1}{W} \sum_{x \in S} \sum_{y \in Y} (C(x, H_{t-1}(x)) - C(x, y)) h(x, y) \quad (9)$$

where W denotes the sum of absolute values of the weights, i.e., $$W = \sum_{x \in S} \sum_{y \in Y} |C(x, H_{t-1}(x)) - C(x, y)|.$$

Note that unlike the weights typically used in existing hosting methods, the weights $w_{x,y} := C(x, H_{t-1}(x)) - C(x, y)$ can be negative, since y is not necessarily the best (least cost) label. This means that the weak learner now receives both positive and negative weights. While the minimization of weighted misclassification with positive and negative weights makes perfect sense as an optimization problem, its interpretation as a classification problem is not immediately clear. In particular, it prohibits the use of weighted sampling as a means of realizing the weighted classification problem.

We deal with this problem by converting a relational version of the weighted multi-class classification problem (i.e., of finding h to maximize Equation 9) in each iteration to a weighted binary classification problem. Specifically, we convert each example pair (x, y) to ((x, y), 1), and set l=1 if the weight on (x, y) is positive, and l=0 if the weight is negative. The output hypothesis of the binary classifier is in general relational, so it is converted to a stochastic hypothesis by the procedure Stochastic. (The particular way this procedure is defined is motivated by the theoretical guarantee, which will be shown in the next subsection.) The overall process, consisting of multiple iterations of such a reduction, constitutes a reduction of the stochastic multi-class cost-sensitive classification to binary weighted classification.

With the foregoing definitions, we can now state our main method, GBSE (Gradient Boosting with Stochastic Ensembles).

Theoretical Performance Guarantee on a Variant

It turns out that a strong theoretical performance guarantee can be proved on a variant of this method, which we describe below. We define the per label average cost, $\tilde{C}(x, H(x))$, of a stochastic hypothesis H, in general, as follows.

$$\tilde{C}(x, H(x)) = \frac{1}{k} \sum_{y \in Y} H(x, y) C(x, y)$$

Note that, with this definition, the empirical loss (cost) of H on the original sample S, C(H, S), can be expressed as the sum of this per label cost over the expanded data set $S'=\{(x, y)|x \in S, y \in Y\}$.

$$C(H, S) = \sum_x \sum_y H(x, y) C(x, y)$$
$$= \sum_x \sum_y \tilde{C}(x, H(x))$$

The variant, for which we prove our theoretical performance guarantee is obtained by simply replacing the weight updating rule of GBSE by the following:

$$w_{x,y} = \tilde{C}(x, H_{t-1}(x)) - C(x, y)$$

The resulting variant, which we call GBSE-T (Gradient Boosting with Stochastic Ensembles—Theoretical version), is summarized in FIG. 5.

We can show that GBSE-T has a boosting property given a version of weak learning condition on the component classifier. This weak learning condition, which we make precise below, is one that is sensitive to class imbalance.

DEFINITION 1. We say that an algorithm A for the binary importance weighted classification problem, as defined above, satisfies the weak learning condition for a given classification sample $S=(x, y)^m$, if for arbitrary distribution over S, $<w>^m$, $\Sigma w=1$, when it is given $S'=(x, y, w)^m$ as input, its output h satisfies the following, for some fixed $\gamma>0$:

$$\sum_{(x,y,w) \in S'} w \cdot I(h(x) = y) \geq \sum_{y=0} w + \gamma \sum_{y=1} w \quad (12)$$

THEOREM 2. Suppose that the component learner A satisfies the weak learning condition for the input sample S. Then, the output of GBSE-T will converge to a stochastic ensemble hypothesis achieving minimum expected cost on the (original) sample S. In particular, if we set $\alpha_t = \alpha$ for all t, $$\sum_x \sum_y H_T(x, y) C(x, y) \leq \exp\left\{-\frac{\gamma \alpha}{k} T\right\} \sum_x \sum_y H_0(x, y) C(x, y)$$

Proof

We first establish the following simple correspondence between the weak learning conditions on the relational multi-class classification problem that we wish to solve in each iteration, and the binary classification problem that is given to the component algorithm to solve it.

DEFINITION 2. Let S be a weighted sample of the form $S=(x, y, w)^m$, where weights w can be both positive and negative. Then define a transformed sample S' from S by $S'=((x,y), l, |w|)^m$ where $l=I(w \geq 0)$.

1. The relational weighted multi-class classification problem for S is to find a relational hypothesis $h: X \times Y \to \{0, 1\}$ that maximizes the following sum:

$$a(h, S) = \frac{1}{W} \sum_{(x,y,w) \in S} w \cdot h(x, y)$$

where $W = \sum_{(x,y,w) \in S} |w|$.

2. The weighted binary classification problem for S' is to find a hypothesis $h': X \times Y \to \{0, 1\}$ that maximizes the following weighted classification accuracy:

$$a'(h', S') = \frac{1}{W} \sum_{((x,y),l,|w|) \in S'} |w| \cdot I(h'(x, y) = l)$$

LEMMA 1. Assume the notation of Definition 2. Then, for arbitrary $\epsilon > 0$, h satisfies the following condition on the relational multi-class classification problem for S:

$$a(h, S) \geq \epsilon$$

if and only if (the same) h satisfies the corresponding condition on the transformed binary classification problem for S':

$$a'(h', S') \geq \frac{\sum_{l=0} |w|}{W} + \epsilon$$

Proof of Lemma 1

$$W \cdot a(h, S') = \sum_{((x,y),l,|w|) \in S'} |w| \cdot I(h(x, y) = l)$$
$$= \sum_{w \geq 0} w \cdot I(h(x, y) = 1) + \sum_{w < 0} -w \cdot I(h(x, y) = 0)$$
$$= \sum_{w \geq 0} w \cdot h(x, y) + \sum_{w < 0} -w(1 - h(x, y))$$
$$= \sum_{(x,y,w) \in S} w \cdot h(x, y) + \sum_{w < 0} |w|$$

-continued $$= W \cdot a(h, S) + \sum_{(x,y,w) \in S: w<0} |w|$$

Hence the lemma follows.

Proof of Theorem 2

First, note that applying Stochastic to $h_t$ can increase the expected cost only for $x$'s such that $|\{y|h_t(x,y)=1\}|=0$, and for such $x$'s the cost of $f_t$ equals that of $H\{t-1\}$ by the definition of Stochastic. Hence, the empirical cost of $f_t$ on the original sample S, $C(f_t, S)$, satisfies the following:

$$C(f_t, S) - C(h_t, S) \le \sum_{x: \forall y\, h(x,y)=0} \sum_y \tilde{C}(x, H_{t-1}(x)) \quad (13)$$

Now recall that the expected empirical cost of $H_t$ equals the following, where we drop the subscript t from $\alpha_t$.

$$C(H_t, S) = \sum_{x,y} (1-\alpha) H_{t-1}(x, y) C(x, y) + \quad (14)$$

-continued $$\alpha \sum_{x,y} f(x,y) C(x,y)$$

$$= \sum_{x,y} (1-\alpha) \tilde{C}(x, H_{t-1}(x)) + \alpha \sum_{x,y} f(x,y) C(x,y)$$

Hence, by combining Equation 13 and Equation 14, we can show the following bound on the decrease in empirical cost in each iteration:

$$C(H_{t-1}, S) - C(H_t, S) = \sum_x \alpha \left( \sum_y \tilde{C}(x, H_{t-1}(x)) - \sum_y f(x,y) C(x,y) \right)$$

$$= \sum_x \alpha \left( \sum_y \tilde{C}(x, H_{t-1}(x)) - \sum_y f(x,y) C(x,y) \right) +$$

$$\sum_x \alpha \left( \sum_y h(x,y) C(x,y) - \sum_y f(x,y) C(x,y) \right) \ge$$

$$\sum_x \alpha \left( \sum_y \tilde{C}(x, H_{t-1}(x)) - \sum_y h(x,y) C(x,y) \right) -$$

$$\alpha \left( \sum_{x: \forall y\, h(x,y)=0} \sum_y \tilde{C}(x, H_{t-1}(x)) \right) \ge$$

$$\alpha \left( \sum_x \left( \sum_{y: h(x,y)=1} h(x,y) (\tilde{C}(x, H_{t-1}(x)) - C(x,y)) \right) + \right.$$

$$\sum_{y: h(x,y)=0} \tilde{C}(x, H_{t-1}(x)) - \sum_{x: \forall y\, h(x,y)=0} \sum_y \tilde{C}(x, H_{t-1}(x))$$

$$= \alpha \left( \sum_x \left( \sum_y h(x,y) (\tilde{C}(x, H_{t-1}(x)) - C(x,y)) \right) + \right.$$

$$\left. \left( \sum_x \sum_{y: h(x,y)=0} \tilde{C}(x, H_{t-1}(x)) - \sum_{x \forall y\, h(x,y)=0} \sum_y \tilde{C}(x, H_{t-1}(x)) \right) \right) \ge$$

$$\alpha \sum_x \sum_y h(x,y) (\tilde{C}(x, H_{t-1}(x)) - C(x,y)) \ge$$

$$\alpha \gamma \sum_x \sum_{y: \tilde{C}(x, H_{t-1}(x)) - C(x,y) > 0} \tilde{C}(x, H_{t-1}(x)) - C(x,y) \ge$$

$$\alpha \gamma \sum_x \tilde{C}(x, H_{t-1}(x))$$

$$= \frac{\alpha \gamma}{k} C(H_{t-1}, S)$$

In the above derivation, the second to last inequality follows from the weak learning condition and applying Lemma 1 with weights $\tilde{C}(x, H_{t-1}(x)) - C(x,y)$. The last inequality follows from the fact that the weights are normalized so that the minimum achievable cost is zero for all x. Noting that the sum of these weights is positive whenever the current ensemble hypothesis is sub-optimal, this guarantees a positive progress in each iteration unless optimality is achieved. Since the expected empirical cost function as defined by $\Sigma_x \Sigma_y F(x,y) C(x,y)$ is convex (in fact linear), this implies convergence to the global optimum. Noting that in each iteration, the empirical cost is reduced at least by a factor of $$1 - \frac{\gamma\alpha}{k},$$

and the theorem follows.

Note that at earlier iterations, the binary classifier used as the component learner is likely to be given weighted sample with balanced positive and negative examples. As the number of iterations increases and progress is made, however, it will receive samples that are increasingly more negative. (This is because the positive examples correspond to labels that can further improve the current performance.) It therefore becomes easier to attain high weighted accuracy by simply classifying all examples to be negative. The weak learning condition of Equation 12 appropriately deals with this issue, as it requires that the weak learner achieve better weighted accuracy than that attainable by assigning all examples to the negative class.

Variations

In addition to the two variants of the Gradient Boosting with StochastiEnsembles method presented above, namely GBSE and GBSE-T, other related variations are possible. For example, in one variant, the weighted sampling can be done in two steps; the instance is sampled in the first step according to a probability proportional to $$\max_y \times w_{x,y}$$

and then choosing the label y with a probability proportional to $$|w_{x,y}|.$$

In a yet another variant, the weighted sampling can be done in two steps; the instance is sampled in the first step according to the same probability as above, and for the chosen instance, examples are deterministically added for all possible labels.

Implementation

Referring now to FIG. 1, there is shown a system on which a method for multi-class, cost-sensitive learning according to the invention may be implemented. This system comprises a multi-class cost-sensitive learning top control module 1 which controls the overall control flow, making use of various sub-components of the system. A learning algorithm storage module 2 stores a representation of an algorithm for classification learning. An arbitrary algorithm for classification can be used here. Alternatively the learning algorithm can be a decision tree learning algorithm, a naïve Bayes method, a logistic regression method or neural networks. The model output module 3 stores the models obtained as a result of applying the learning algorithm stored in module 2 to training data given by weighted sampling module 4 and outputs a final model by aggregating these models. The weighted sampling module 4 accesses the data stored in data storage module 7, samples a relatively small subset of the data with acceptance probability determined using the example weights, and passes the obtained sub-sample to module 1. The weight update module 5 updates the example weights for sampling using a particular function determined by the current weights and current models. The model update module 6 updates the current model using the model's output in the previous iterations stored in the current model storage module 8 and the output model of the current iteration output by module 3 and stores the resulting updated model in module 8.

Figure 2:
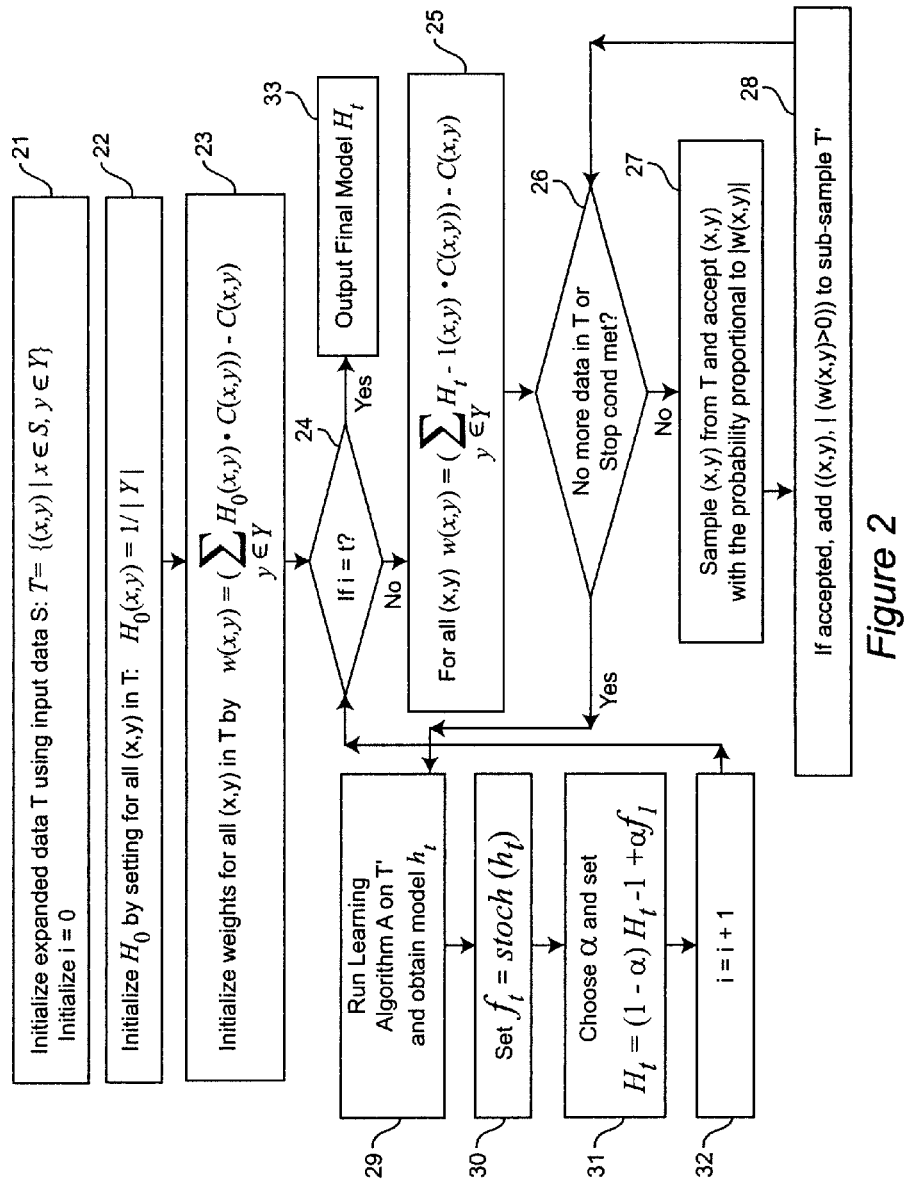
FIG. 2 is a flow chart showing the logic of the method for multi-class cost-sensitive learning implemented on the system shown in FIG. 1.

FIG. 2 shows a flow diagram of the process implemented in the system of FIG. 1. The first three steps initialize the process. In Step 21, expanded data T is initialized using the input data S. In Step 22, $H_0$ is initialized by setting for all (x, y) in T. Finally, in Step 23, the weights for all (x, y) in T are initialized. The iteration begins in the decision block of Step 4. A test is made to determine if i=t. If not, Step 25 performs the computation for all (x, y)

$$w(x, y) = \left(\sum_{y \in Y} H_{t-1}(x, y) \cdot C(c, y)\right) - C(x, y)$$

The decision block in Step 26 determines if there is more data in T or a STOP condition has been met. If not, in Step 27, (x, y) is sampled from T and accepted with a probability proportional to |w(x, y)|. Next, in Step 28, if accepted, ((x, y), I(w(x, y)>0)) is added to sub-sample T'. A return is then made to the decision block in Step 26. When there is no more data in T or a STOP condition has been met, the process goes to Step 29 where the learning algorithm is run on T' to obtain model $h_t$. Next, in Step 30, $f_t$ is set equal to stoch($h_t$). Then, in Step 31, $\alpha_t$ is chosen and $H_t$ is set equal to $(1-\alpha_t)H_{t-1}+\alpha_t f_t$. The index i is incremented at Step 31, and a return is then made to the decision block in Step 24. If i=t, then in Step 33 the final model $H_t$ is output.

Figure 3:
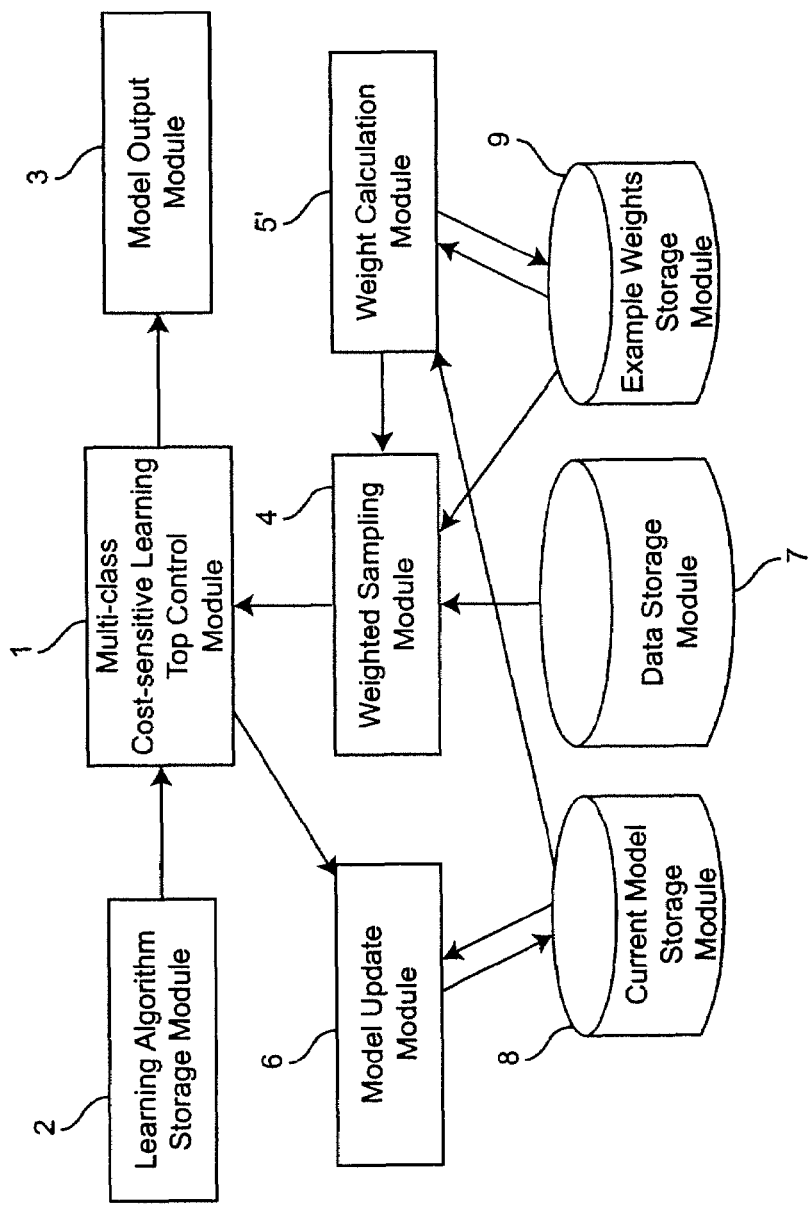
FIG. 3 is a block diagram showing the architecture of the system implementing another one of the methods according to the invention.

FIG. 3 shows a system on which another method for multi-class, cost-sensitive learning according to the invention may be implemented. This system is similar to that shown in FIG. 1 and comprises a multi-class cost-sensitive learning top control module 1 which controls the overall control flow, making use of various sub-components of the system, a learning algorithm storage module 2, which stores a representation of an algorithm for classification learning, a model output module 3, which stores the models obtained as a result of applying the learning algorithm stored in module 2 to training data given by weighted sampling module 4 and outputs a final model by aggregating these models, and a weighted sampling module 4, which accesses the data stored in data storage module 7, samples a relatively small subset of the data with acceptance probability determined using the example weights, and passes the obtained sub-sample to module 1. The weight calculation module 5' replaces the weight upadate module 5, which updates the example weights for sampling using a dynamically changing weighting scheme. The model update module 6 updates the current model using the model's output in the previous iterations stored in the current model storage module 8 and the output model of the current iteration output by module 3 and stores the resulting updated model in module 8.

Figure 4:
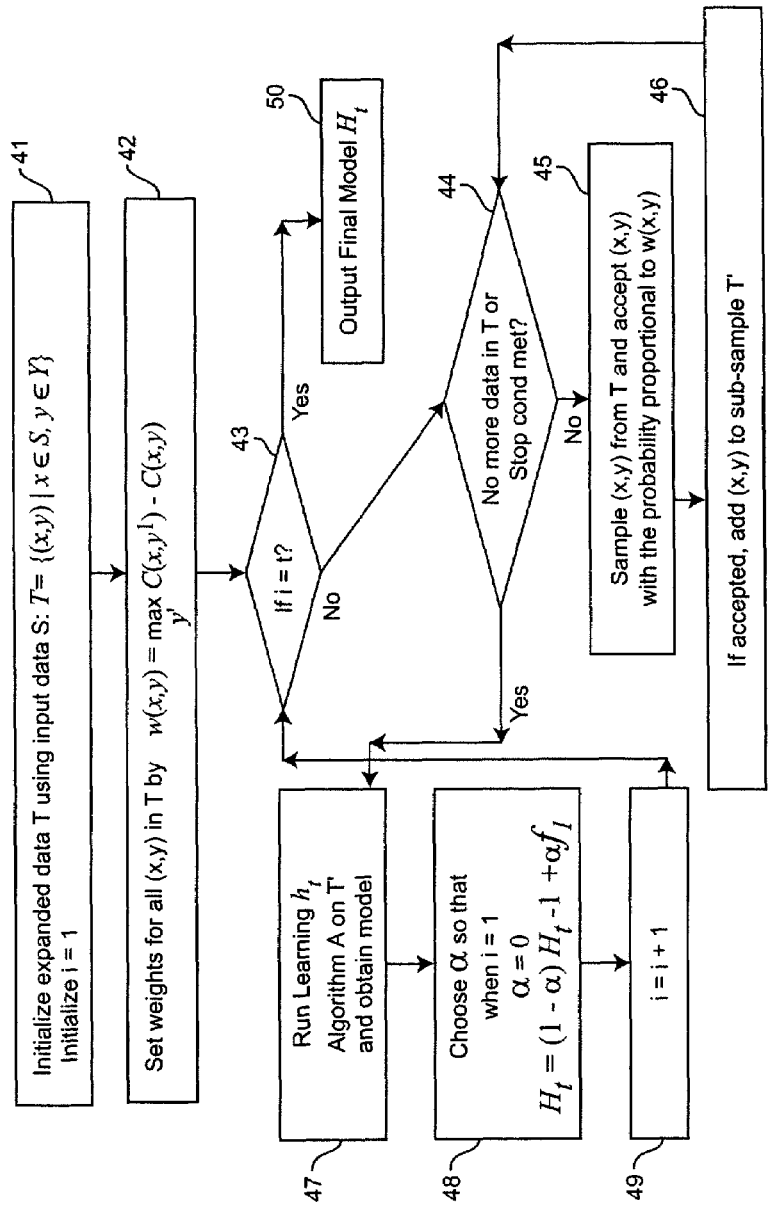
FIG. 4 is a flow chart showing the logic of the method for multi-class cost-sensitive learning implemented on the system shown in FIG. 3.

FIG. 4 shows a flow diagram of the process implemented in the system of FIG. 3. The first step initializes the process. In Step 41, expanded data T is initialized using the input data S. In Step 42, the weights for all (x, y) in T are set. The iteration begins in the decision block of Step 43. A test is made to determine if i=t. If not, a test is made in Step 44 to determine if there is no more data in T or a stop condition has been met. If not, Step 45 samples (x, y) from T and accepts (x, y) with probability proportional to w(x, y). If accepted, (x, y) is added to sub-sample T' in Step 46. The process then loops back to decision block in Step 44 until there is either no more data in T or a stop condition has been met. At this point, the learning algorithm is run in Step 47 on T' to obtain a model $h_t$. In Step

48, α is chosen so that when i=1, α=0 and $H_t=(1-\alpha_t)H_{t-1}+\alpha_t f_t$. The index i is incremented at Step 49, and a return is then made to the decision block in Step 43. If i=t, then in Step 50 the final model $H_t$ is output.

As a concrete example of applying the method of the invention to a real world problem, we describe an application to network intrusion detection. Network intrusion detection has recently become a proto-typical application problem for multi-class, cost-sensitive learning. The multi-class aspect is essential because in this application there are typically more than one level of intrusion detection, such as probing and denial of service. The cost-sensitive aspect is important because vastly different costs are associated with different types of misclassification (e.g., false negatives are usually a magnitude more costly than false positives) and it is absolutely critical that any learning method used to derive an intrusion detection rule is sensitive to this cost structure.

A network intrusion detection system based on the method and system of the invention for multi-class, cost-sensitive learning consists of the following steps:

1) Convert past network connection data to a set of feature vectors, by mapping information on a network connection to a feature vector.
2) Label each of these vectors with known labels, such as "normal", "probe", "denial of service", or specific types of intrusions.
3) Apply the method of the invention on the above data set, and obtain a classification rule.
4) Convert new network connection data to feature vectors, apply the above classification rule to them, and flag those connections corresponding to feature vectors that are classified as different types of "intrusions" as such.

A typical set of features used to transform connection data into a well-defined feature vector is that used in the network intrusion data set known as "KDD CUP 99" data, which is publically available. Here is the list of features in this data set (given in three separate tables).

Basic Features of Individual TCP Connections

| feature name | description | type |
|---|---|---|
| duration | length (number of seconds) of the connection | continuous |
| protocol_type | type of protocol, e.g., TCP, UDP, etc. | discrete |
| service | network service on the destination, e.g., http, telnet, etc. | discrete |
| src_bytes | number of data bytes from source to desitination | continuous |
| dst_bytes | number of data bytes from destination to source | continuous |
| flag | normal or error status of the connection | discrete |
| land | 1 if connection is from/to the same host/port; 0 otherwise | discrete |
| wrong_fragment | number of "wrong" fragments | continuous |
| urgent | number of urgent packets | continuous |

Content Features Within a Connection Suggested by Domain Knowledge

| feature name | description | type |
|---|---|---|
| hot | number of "hot" indicators | continuous |
| num_failed_logins | number of failed login attempts | continuous |
| logged_in | 1 if successfully logged in; 0 otherwise | discrete |
| num_compromised | number of "compromised" conditions | continuous |
| root_shell | 1 if root shell is obtained; 0 otherwise | discrete |
| su_attempted | 1 if "su-root" command attempted; 0 otherwise | discrete |
| num_root | number of "root" accesses | continuous |
| num_file_creations | number of file creation operations | continuous |
| num_shells | number of shell prompts | continuous |
| num_access_files | number of operations on access control files | continuous |
| num_outbound_cmds | number of outbound commands in an ftp session | continuous |
| is_hot_login | 1 if the login belongs to the "hot" list; 0 otherwise | discrete |
| is_guest_login | 1 if the login is a "guest" login; 0 otherwise | discrete |

Traffic Features Computed Using a Two-Second Time Window

| feature name | description | type |
|---|---|---|
| count | number of connections to the same host as the current connection in the past two seconds Note: The following features refer to these same host connections. | continuous |
| serror_rate | % of connections that have "SYN" errors | continuous |
| rerror_rate | % of connections that have "REJ" errors | continuous |
| same_srv_rate | % of connections of the same service | continuous |
| diff_srv_rate | % of connections of different services | continuous |
| srv_count | number of connections to the same service as the current connection in the past two seconds Note: The following features refer to these same-service connections. | continuous |
| srv_server_rate | % of connections that have "SYN" errors | continuous |
| srv_rerror_rate | % of connections that have "REJ" errors | continuous |
| srv_diff_host_rate | % of connections to different hosts | continuous |

As a result of applying the multi-class, cost-sensitive learning method of the invention to a data set consisting of these features and the corresponding labels, using a decision tree algorithm as the "classification learning algorithm" stored in Module 2 of FIG. 1, one obtains, as the classification rule, a voting function over a number of decision trees, such as the tree shown in FIG. 5.

The system diagram of FIG. 1 and the flow chart of FIG. 2 illustrate a preferred embodiment of the invention, which corresponds to the method "GBSE" described herein. However, it will be understood by those skilled in the art that the method "DSE", also described herein, may be used in the alternative. The main difference between DSE and GBSE is that in DSE, the sampling weights remain unchanged throughout all iterations. Consequently, the modules and functionalities that are related to weight updating are unnecessary.

Experimental Evaluation

We use the C4.5 decision tree learner described by J. Quinlan in *C4.5: Programs for Machine Learning*, Morgan Kaufmann (1993), as the base classifier learning method, because it is a standard for empirical comparisons and it was used as the base learner by Domingos for the MetaCost method (see, P. Domingos, "MetaCost: A general method for making classifiers cost sensitive", *Proceedings of the Fifth International Conference on Knowledge Discovery and Data Mining*, pp. 155-164, ACM Press, 1999).

We compare our methods against three representative methods: Bagging (see L. Breiman, "Bagging predictors", *Machine Learning*, 24(2):123-140, 1996), Averaging cost (see, P. Chan and S. Stolfo, "Toward scalable learning with non-uniform class and cost distributions", *Proceedings of the Fourth International Conference on Knowledge Discovery and Data Mining*, pp. 164-168, 1998), and MetaCost (see, Domingos, ibid.). The Averaging cost method was also used for comparison in Domingos, ibid. Note that Bagging is a cost-insensitive learning method. Here we give a brief description of these methods, and refer the reader to Breiman, ibid., and Domingos, ibid., for the details.

Bagging obtains multiple sub-samples by sampling with replacement, feeds them to the base learner (C4.5), and takes the average over the ensemble of output hypotheses.

Averaging Cost (AvgCost) obtains a subsample by weighted sampling with weights defined as the average cost for each x, and then feeds it to the base learner (C4.5).

MetaCost uses bagging to obtain an ensemble of hypotheses, uses the ensemble to estimate the class probabilities, and then outputs a hypothesis that minimizes the expected risk with respect to these estimates.

There are some deviations from these methods in our implementation, which we clarify below. The main deviation is that we use rejection sampling for all methods, while other sampling schemes such as resampling with replacement are used in the original methods. We do this for two reasons: (1) inadequacy of resampling with replacement, especially for C4.5, has been noted by various authors (see, for example, B. Zadrozny, J. Langford, and N. Abe, "Cost-sensitive learning by cost-proportionate example weighting", *Proceedings of the Third IEEE International Conference on Data Mining*, pp. 435-442, 2003); and (2) since our methods use rejection sampling, we do the same for the other methods for fairness of comparison. We stress that this deviation should only improve their performance. Another deviation is that we use a variant of MetaCost that skips the last step of learning a classifier on a relabeled training data set. It has been observed that this variant performs at least as well as MetaCost, in terms of cost minimization. (This variant has been called BagCost by D. Margineantu in *Methods for Cost-Sensitive Learning*, PhD thesis, Department of Computer Science, Oregon State University, Corvallis, Oreg., 2001.) Also, in our implementation of AvgCost, we perform weighted sampling multiple times to obtain an emsemble of hypotheses, then output their average as the final hypothesis. We note that, due to our normalization assumption that the minimum cost for each instance x is always zero, our version of AvgCost is identical to a more sophisticated variant in which the difference between the average cost and the minimum cost is used for sampling weights. Our experience shows that this variant of AvgCost performs better than the original method.

The methods were applied to five benchmark datasets available from the UCI machine learning repository (C. L. Blake and C. J. Merz, "UCI repository of machine learning databases", Department of Information and Computer Sciences, University of California, Irvine, Calif., 1998) and one dataset from the UCI KDD archive (S. D. Bay, "UCI archive", Department of Information and Computer Sciences, University of California, 2000). These datasets were selected by the criteria of having approximately 1,000 data or more, besides being multiclass problems. A summary of these datasets is given in Table 1.

TABLE 1

Data set characteristics: data size, number of classes, and the ratio between the frequency of the most common class to the least common.

| Dataset | # of examples | # of classes | Class ratio |
|---------|---------------|--------------|-------------|
| Annealing | 898 | 5 | 0.01316 |
| KDD-99 | 197710 | 5 | 0.0001278 |
| Letter | 20000 | 26 | 0.9028 |
| Satellite | 6435 | 6 | 0.4083 |
| Solar flare | 1389 | 7 | 0.002562 |
| Splice | 3190 | 3 | 0.4634 |

Except for the KDD-99 dataset, these datasets do not have standard misclassification costs associated with them. For this reason, we follow Domingos and generate cost matrices according to a model that gives higher costs for misclassifying a rare class as a frequent one, and inversely for lowest. (Note therefore that our experiments do not exploit the full generality of the instance-dependent cost formulation presented above.) This reflects a situation that is found in many practical data mining applications, including direct marketing and fraud detection, where the rare classes are the most valuable to identify correctly.

Our cost model is as follows: Let $\hat{P}(y_1)$ and $\hat{P}(y_2)$ be the empirical probabilities of occurrence of classes $y_1$ and $y_2$ in the training data. We choose the non-diagonal entries of the cost matrix $C(y_1, y_2)$, $y_1 \neq y_2$ with uniform probability from the interval $[0, 2000 \ \hat{P}(y_1)/\hat{P}(y_2)]$. In Domingos, ibid., the diagonal entries were then chosen from the interval $[0,1000]$, which often leads to cost matrices in which the correct label is not the least costly one. Besides being unreasonable (see C. Elkan, "Magical thinking in data mining: Lessons from coil challenge 2000", *Proceedings of the Seventh International Conference on Knowledge Discovery and Data Mining*, pp. 426-431, ACM Press, 1999), these cost matrices can give an unfair advantage to cost-sensitive methods over cost-insensitive ones. We therefore set the diagonal entries to be identically zero, which is consistent with our normalization assumption.

In all experiments, we randomly select ⅔ of the examples in the dataset for training and use the remaining ⅓ for testing. Also, for each training/test split we generate a different cost matrix according to the rules above. Thus, the standard deviations that we report reflect both variations in the data and in the misclassification costs.

We remark on certain implementation details of the proposed learning methods in our experimentation. First, we note that in all of the methods used for comparison, C4.5 was used as the component algorithm, and the final hypothesis is expressed as an ensemble of output decision tress of C4.5. Its output hypothesis is therefore also an ensemble of decision trees. Next, the choice of the mixture weight $\alpha_t$ was unspecified in the algorithm descriptions. The choice of $\alpha_t$ was set at 1/t for most methods.

The results of these experiments are summarized in Tables 2 and 3.

TABLE 2

Experimental results: the average cost and standard error.

| Dataset | Bagging | AvgCost | MetaCost | DSE | GBSE |
|---|---|---|---|---|---|
| Annealing | 1059 ± 174 | 127.4 ± 12.2 | 206.8 ± 42.8 | 127.1 ± 14.9 | 33.72 ± 4.29 |
| Solar | 5403 ± 397 | 237.8 ± 37.5 | 5317 ± 390 | 110.9 ± 28.7 | 48.17 ± 9.52 |
| KDD-99 | 319.4 ± 42.2 | 42.43 ± 7.95 | 49.39 ± 9.34 | 46.68 ± 10.16 | 1.69 ± 0.78 |
| letter | 151.0 ± 2.58 | 91.90 ± 1.36 | 129.6 ± 2.44 | 114.0 ± 1.43 | 84.63 ± 2.24 |
| Splice | 64.19 ± 5.25 | 60.78 ± 3.65 | 49.95 ± 3.05 | 135.5 ± 14 | 57.50 ± 4.38 |
| Satellite | 189.9 ± 9.57 | 107.8 ± 5.95 | 104.4 ± 6.43 | 116.8 ± 6.28 | 93.05 ± 5.57 |

TABLE 3

Experimental results: the average data size used by each method in 30 iterations, and standard error.

| Dataset | Bagging | AvgCost | MetaCost | DSE | GBSE |
|---|---|---|---|---|---|
| Annealing | 11991 ± 13.1 | 1002.8 ± 183 | 11987 ± 9.84 | 3795.5 ± 688 | 1260.2 ± 224 |
| Solar | 18499 ± 20.4 | 334.80 ± 37.5 | 18510 ± 14.4 | 2112.8 ± 276 | 486.45 ± 53.3 |
| KDD-99 | 395310 ± 143 | 2551.9 ± 428.6 | 395580 ± 143 | 12512 ± 2450 | 4181 ± 783.6 |
| letter | 40037 ± 44.3 | 159720 ± 2028 | 40052 ± 41 | 479130 ± 2710 | 363001 ± 5557 |
| Splice | 42515 ± 26.6 | 33658 ± 1697 | 42501 ± 21 | 52123 ± 592 | 50284 ± 3659 |
| Satellite | 86136 ± 123 | 60876 ± 1641 | 85984 ± 127 | 218870 ± 6516 | 140810 ± 3335 |

Table 2 lists the average costs attained by each of these methods on the 6 data sets, and their stand errors. These results were obtained by averaging over 20 runs, each run consisting of 30 iterations of the respective learning method. These results appear quite convincing: GBSE out-performs all comparison methods on all data sets, except on Splice, for which it ranks second after MetaCost. Also, GBSE is the best performing among the proposed methods, confirming our claim that the combination of various techniques involved is indeed necessary to attain this level of performance.

Table 3 lists the average total data size used by each of the methods in 30 iterations. Examining these results in conjunction with the data characteristics in Table 1 reveals a definite trend. First, note that the data sets are divided into to groups: those having very large skews, or very low class ratios (Annealing, KDD-99 and Solar flare), and those having moderate skews (Satellite, Splice and Letter). It is evident that the methods based on example weighting (AvgCost, GBSE, DSE) use magnitudes smaller data sizes for the three data sets in the first group (i.e., with large skews), as compared to other methods, Bagging and MetaCost. The performance of GBSE is especially impressive on this group, achieving much lower costs while requiring very small data sizes. It is worth mentioning that it is these data sets in the first group with large skews that require cost-sensitive learning the most.

We have provided a novel method for multiclass cost-sensitive learning based on gradient boosting with stochastic ensembles. It is not the first time that the issue of incorporating cost-sensitivity to boosting has been addressed. For example, AdaCost (see W. Fan, S. J. Stolfo, J. Zhang, and P. K. Chan, "AdaCost: Misclassification cost-sensitive boosting", *Proceedings of the Sixteenth International Conference on Machine Learning*, pp. 97-105, 1999) suggested a way of modifying AdaBoost's exponential loss using a function (called cost adjustment function) of the cost and confidence. The rational choice of this cost adjustment function, however, appears not to be well-understood. The stochastic ensemble that we employ in this method provides a straightforward but reasonable way of incorporating cost and confidence; i.e., in terms of expected cost.

While the invention has been described in terms of a single preferred embodiment, those skilled in the art will recognize that the invention can be practiced with modification within the spirit and scope of the appended claims.

Having thus described our invention, what we claim as new and desire to secure Letters Patent is as follows:

1. A computer implemented method for multi-class, cost-sensitive learning for a process selected from the group consisting of network intrusion detection, fraud detection, targeted marketing, and credit risk rating, wherein said computer implemented method is based on an example weighting scheme applied to a chosen data set comprising the steps of:
   a) obtaining a data set from a data storage module, said data set comprising an original data set enhanced with additional data points corresponding in number to a number of labels for a single instance;
   b) iteratively applying weighted sampling from said data set, using a dynamically changing weighting scheme involving both positive and negative weights obtained from an example weights storage module;
   c) calling a classification learning algorithm on a modified binary classification problem in which each example is itself already a labeled pair, and its label is 1 or 0 depending on whether the example weight in the above weighting scheme is positive or negative, respectively, and obtains a hypothesis representing a classifier;
   d) outputting all representations obtained through the iterations and representing an average over them, each of which is an arbitrary representation of the classifier, said average being used for one of network intrusion detection, fraud detection, targeted marketing, and credit risk rating.

2. The computer implemented method for multi-class, cost-sensitive learning recited in claim 1, wherein the classification learning algorithm is selected from the group consisting of decision tree algorithms, naïve Bayes method, logistic regression method and neural networks.

3. The computer implemented method for multi-class, cost-sensitive learning recited in claim 2, wherein the classification learning algorithm is a decision-tree algorithm providing a voting function over multiple decision trees.

4. The computer implemented method for multi-class, cost-sensitive learning recited in claim 1, wherein the iteratively applied weighted sampling of step b) gives each labeled example a weight specified as a difference between an average cost on that instance by the averaged hypotheses from iterations so far and a misclassification cost associated with the label in the labeled example in question.

5. The computer implemented method for multi-class, cost-sensitive learning recited in claim 1, wherein the iteratively applied weighted sampling of step b) gives each labeled example a weight specified as a difference between an average cost on that instance by an averaged hypotheses from iterations so far divided by a number of labels per instance, and a misclassification cost associated with the label in the labeled example in question.

6. The computer implemented method for multi-class, cost-sensitive learning recited in claim 1, wherein the iteratively applied weighted sampling of step b) gives each labeled example a weight specified as a difference between an average cost on that instance by an averaged hypotheses from iterations so far divided by a number of labels per instance, and a misclassification cost associated with the label in the labeled example in question, and the weighted sampling comprises the steps of:

sampling the instance in step a) according to a probability proportional to a maximum of weights for that instance and any of the labels, and choosing a label with a probability proportional to the absolute value of a weight for that instance and the label in question.

7. The computer implemented method for multi-class, cost-sensitive learning recited in claim 1, wherein the iteratively applied weighted sampling of step b) gives each labeled example a weight specified as a difference between an average cost on that instance by an averaged hypotheses from iterations so far divided by a number of labels per instance, and a misclassification cost associated with the label in the labeled example in question, and the weighted sampling comprises the steps of:

sampling the instance step a) according to a probability proportional to a maximum of weights for that instance and any of the labels, and for the chosen instance, deterministically adding examples for all possible labels.

8. The computer implemented method of claim 1, wherein said obtained classifier is modified mapping elements of domain to the labels, wherein said classifier is stochastic, namely a conditional probability distribution so that its probabilities over the set of labels sum to one for each instance.

9. A computer implemented method for multi-class, cost-sensitive learning based on an example weighting scheme applied to a chosen data set comprising the steps of:

a) obtaining a data set from a data storage module, said data set comprising an original data set enhanced with additional data points corresponding in number to a number of labels for a single instance;

b) iteratively applying weighted sampling from said data set, using a dynamically changing weighting scheme involving both positive and negative weights obtained from an example weights storage module;

c) calling a classification learning algorithm on a modified binary classification problem in which each example is itself already a labeled pair, and its label is 1 or 0 depending on whether the example weight in the above weighting scheme is positive or negative, respectively, and obtains a hypothesis representing a classifier;

d) outputting all representations obtained through the iterations and representing an average over them, each of which is an arbitrary representation of the classifier, wherein the computer implemented method is a network intrusion detection method and each one of the representations is a decision tree that specifies a set of conditions on various attributes of a network connection event, which together signal certain types of network intrusion.

10. A computer implemented method for multi-class, cost-sensitive learning based on an example weighting scheme applied to a chosen data set comprising the steps of:

a) obtaining a data set from a data storage module, said data set comprising an original data set enhanced with additional data points corresponding in number to a number of labels for a single instance;

b) iteratively applying weighted sampling from said data set, using a dynamically changing weighting scheme involving both positive and negative weights obtained from an example weights storage module;

c) calling a classification learning algorithm on a modified binary classification problem in which each example is itself already a labeled pair, and its label is 1 or 0 depending on whether the example weight in the above weighting scheme is positive or negative, respectively, and obtains a hypothesis representing a classifier;

d) outputting all representations obtained through the iterations and representing an average over them, each of which is an arbitrary representation of the classifier, wherein the representations are further applied on a new network connection to output judgment whether or not the connection is to be suspected to be some type of an intrusion attempt with reasonable likelihood, and further comprising the step of denying service to the network connection.

* * * * *